US008328641B2

(12) United States Patent
Bradshaw

(10) Patent No.: US 8,328,641 B2
(45) Date of Patent: Dec. 11, 2012

(54) ACCOUNTING SYSTEM AND METHOD FOR CASINO GAME REVENUE

(76) Inventor: Ira W. Bradshaw, Las Vegas, NV (US)

( * ) Notice: Subject to any disclaimer, the term of this patent is extended or adjusted under 35 U.S.C. 154(b) by 261 days.

(21) Appl. No.: 12/652,915

(22) Filed: Jan. 6, 2010

(65) Prior Publication Data

US 2010/0130282 A1 May 27, 2010

Related U.S. Application Data

(63) Continuation-in-part of application No. 11/152,683, filed on Jun. 13, 2005, now abandoned, and a continuation-in-part of application No. 09/385,520, filed on Aug. 30, 1999, now Pat. No. 6,905,409.

(51) Int. Cl.
*G06F 17/00* (2006.01)

(52) U.S. Cl. .................................................. 463/42

(58) Field of Classification Search .................... 463/16, 463/25, 29, 40, 42, 43; 273/138.1, 274, 309; 705/35; 763/16, 25, 29, 40, 42, 43
See application file for complete search history.

(56) References Cited

U.S. PATENT DOCUMENTS

| | | | | |
|---|---|---|---|---|
| 5,770,533 | A * | 6/1998 | Franchi | 463/42 |
| 5,813,912 | A * | 9/1998 | Shultz | 463/25 |
| 5,919,090 | A * | 7/1999 | Mothwurf | 463/25 |
| 5,957,776 | A * | 9/1999 | Hoehne | 463/25 |
| 6,336,857 | B1 * | 1/2002 | McBride | 463/12 |
| 6,733,388 | B2 * | 5/2004 | Mothwurf | 463/17 |
| 2002/0087441 | A1 * | 7/2002 | Wagner et al. | 705/30 |
| 2005/0234860 | A1 * | 10/2005 | Roever et al. | 707/1 |
| 2008/0188339 | A1 * | 8/2008 | Bader et al. | 475/149 |

* cited by examiner

*Primary Examiner* — Ronald Laneau
(74) *Attorney, Agent, or Firm* — Howard & Howard Attorneys PLLC

(57) ABSTRACT

Systems and methods which provide real-time accounting for transactional exchanges involving credit or cash and gaming chips conducted between players and the casino at gaming tables.

14 Claims, 10 Drawing Sheets

ACCOUNTING SYSTEM AND METHOD FOR CASINO GAME REVENUE

CROSS-REFERENCE TO RELATED APPLICATIONS

This is a continuation-in-part of U.S. patent application Ser. No. 11/152,683 filed on Jun. 13, 2005, entitled "Accounting System And Method For Casino Game Revenue" which is a continuation-in-part of U.S. patent application Ser. No. 09/385,520, filed 30 Aug. 1999, now issued as U.S. Pat. No. 6,905,409, and also entitled "Accounting System And Method For Casino Game Revenue", the disclosures of which are herein incorporated by reference in their entirety.

BACKGROUND OF THE INVENTION

1. Field of the Invention

This invention provides for a system of recording the transactions entering into the computation of a casinos table game revenue/win or loss at the time a players cash or IOU, also referred to as a marker, is inserted into a drop box at a gaming table. Specifically, the invention relates to a computer system and method for accounting for the flow of cash funds or credit from a player to the casino in exchange for the casinos gaming chips at the casino's gaming tables. The invention is suitable for or adaptable to 21 or blackjack, craps and other table games such as roulette.

2. Description of the Related Art

Currently casinos generally perform a count of the contents of all of the drop boxes of the entire casino at the end of the three eight-hour shifts that make up the casino's day for accounting purposes. The drop boxes would have been removed from their position fastened to the various gaming tables throughout the casino and transferred to a count room where the count would take place. The transactions occurring at the gaming tables between a player and the casino (other than the betting transactions) that ultimately determine a table game's win or loss are those involving the exchange of the casino's gaming chips and the player's cash or credit. These transactions are standard to the gaming industry and will generally be the same from casino to casino. The central issue to this invention is that currently all casinos determine table game revenue after the fact from the results of the count in the count room at the end of the casino's day for accounting purposes. The determination of gaming win or loss is the simple accounting inventory process of measuring or accounting for the assets on hand at each gaming table at the end of a period compared to those on hand as measured and accounted for at the beginning of that period. This process is described in the following paragraphs.

Beginning inventory: At the beginning of each shift each table's chips and coin are counted and recorded on a table inventory form. A copy of the inventory form is inserted in the drop box of the table.

Exchange of cash for chips: A player tenders cash in exchange for chips by placing the tendered cash on the gaming table. The dealer takes the cash, removes the equivalent amount of chips from the chip rack, slides them to the player, inserts the cash in the drop box and the player enters into the betting transactions of the game.

Exchange of credit for chips: A player with pre-established credit comes to a gaming table and asks for credit. After proper authorization a supervisory person prepares a pre-numbered marker form in at least triplicate form in the amount of credit requested. The three parts are (a) Original, (b) Issue copy, and (c) Payment copy. The marker form is signed by the player receiving the credit and the casino individual who approves the extension of credit.

The original and the payment copy are retained in the pit by the authorizing individual and the issue copy is signed or initialed by the dealer. The dealer then slides chips in an amount equivalent to the amount of credit entered on the marker to the player and inserts the issue copy in the drop box.

Repayment of credit at a table: When a marker is paid in full at a table, the payment copy will be annotated to include the nature of the payment (cash, chips, etc.), the amount of payment, and the table number at which the payment is received. It will be signed by the pit supervisor acknowledging the payment and the dealer receiving the payment. The dealer will then place the chips in the chip rack, if paid by chips, or insert the cash in the drop box if paid in cash. The dealer will then insert the payment copy in 30 the drop box.

When partial payments are made at a table, a new marker is completed reflecting the remaining balance and the marker number of the marker originally issued. After proper signing or initialing, the dealer inserts the issue copy of the partial payment marker in the drop box.

Transfer of chips from cashier's cage to a table: Transfers from the cashier's cage to a table (fills) are initiated by a pit supervisor through a request communicated to the cashier's cage. Fill slips are pre-numbered and are prepared in triplicate parts. One part is transferred to the table with the amount of chips requested. The chips are placed in the chip rack by the dealer. After verification by the dealer the fill slip is signed or initialed and inserted into the drop box.

Transfers of chips from a table to the cashier's cage: Generally an order for the transfer of chips from a table to the cashier's cage is initiated by a pit supervisor. The order is sent to the cashier's cage where a transfer slip (credit slip) is prepared in triplicate in the amount of the prospective transfer of chips from a table. One part of the credit slip is transported to the table. After verification of the amount the dealer removes the appropriate amount of chips from the table chip rack and they are transported to the cashier's cage by the appropriate casino person. After the credit slip has been signed of initiated, the dealer inserts it in the drop box.

Shift closing procedures: At the end of each shift each table's chips and coins are again counted and recorded on a table inventory form and inserted in the table's drop box.

Concurrently with the table inventory, all locked drop boxes are removed from the tables by an authorized individual and are replaced by empty drop boxes to be utilized for the next shift.

The removed drop boxes are transported directly to a count room or other secure place and locked in a secure manner until the count takes place.

Counting and recording procedures: At the end of the three shifts which comprise the casino's day for accounting purposes the contents of each drop box are counted and the results are entered on count sheets. The count sheets are then transferred to the accounting department where the day's win or loss is recorded in the casino's accounting records.

This process can be illustrated by a hypothetical win of $120,000 at typical table as determined by the counting and recording of the contents of the drop box at the end of the casino's day for accounting purposes. The count of the contents of the drop box reveals the following:

Assets on hand, end of shift:

| | |
|---|---|
| Inventory of chips and coin, end of shift | $ 20,000 |
| Cash per count | $100,000 |
| Credit slips for transfers of chips to cashier | $ 10,000 |
| Markers | 10,000 |
| Total assets included in count of drop box: | $140,000 |

Assets on hand, beginning of shift (or added during shift):

| | |
|---|---|
| Inventory of chips and coin | $ 10,000 |
| Fill slips for transfers from the cashiers cage | $ 5,000 |
| Markers repaid at the table | $ 5,000 |
| Total assets, beginning of shift or added during shift: | $ 20,000 |
| Win of table for the shift: | $120,000 |

This hypothetical table win for a hypothetical shift illustrates that a casino's daily win or loss is determined by counting and tabulating the contents of each drop box of each gaming table. The current system is dependent entirely on the integrity of the count and the recordation of the contents of the drop boxes. No independent record of the table transactions is maintained in such a manner as to permit a predetermination of the results of the transactions at a gaming table. The current system depends entirely on the human element, i.e., the integrity of the workers conducting the transactions, and internal controls utilizing the people watching people concept. There is no automated, independent means or recording and monitoring table game transactions.

Therefore, a need exists to provide a more reliable and precise accounting system and method which is capable of providing real time information as to table game transactions, win/loss information and trends, and providing a predetermined accounting of the contents of each gaming table's drop boxes before the contents of the drop box is counted.

BRIEF SUMMARY OF THE INVENTION

It is an object of the present invention to provide a system and method for entering transaction data that occurs in relation to a gaming table.

It is another object of the present invention to provide a system and method for tabulating the entered transaction data for comparison to the inventory of gaming chips and receipts and cash deposited in a gaming table lock box.

In accordance with one embodiment of the present invention, a casino gaming table accounting system comprises a central computer and a plurality of gaming terminals coupled to the central computer where each of the plurality of gaming terminals is located in the proximity of a gaming table. Each of the plurality of gaming terminals comprises a data entry device for entering transaction data for transactions that occur at the gaming table; a display for displaying the entered transaction data; and at least one I/O port for transmitting data to the central computer. The gaming terminal is essentially a dumb device that simply transmits data to the central computer and has little, if any, processing capability.

In accordance with another embodiment of the present invention, a casino gaming table accounting system comprises a central router and/or server and a plurality of gaming computers coupled to the central router and/or server where each of the plurality of gaming terminals is located in the proximity of a gaming table. Each of the plurality of gaming computers comprises a data entry device for entering transaction data for transactions that occur at the gaming table; a display for displaying the entered transaction data; a processor for executing a software program wherein the processor reads and stores the entered transaction data; a memory array for storing the entered transaction data; and at least one I/O port for transmitting and receiving data from the central router and/or server.

In still another embodiment the gaming computer described above can act as a stand alone, non-networked device. In this embodiment, data is entered and tabulated on a gaming computer located in the proximity of a gaming table. The raw and tabulated data may be displayed on the gaming computer or may be stored on a diskette or other peripheral device for access by another system.

A method for casino gaming table accounting comprises the steps of providing a central computer and providing a plurality of gaming terminals coupled to the central computer wherein each of the plurality of gaming terminals is located in the proximity of a gaming table.

Another method for casino gaming table accounting comprises the steps of providing a central router and/or server and providing a plurality of gaming computers coupled to the central router and/or server wherein each of the plurality of gaming terminals is located in the proximity of a gaming table.

Still another method for casino gaming accounting comprises the steps of providing at least one gaming computer located in the proximity of a gaming table wherein each of the at least one gaming computers comprises the steps of providing a data entry device for entering transaction data for transactions that occur at the gaming table; providing a display for displaying the entered transaction data; providing a processor for executing a software program wherein the processor reads and stores the entered transaction data; providing a memory array for storing the entered transaction data; and providing at least one peripheral device for outputting the entered transaction data.

The foregoing and other objects, features, and advantages of the invention will be apparent from the following, more particular, description of the preferred embodiments of the invention, as illustrated in the accompanying drawings.

DETAILED DESCRIPTION OF THE INVENTION

Figure 1:
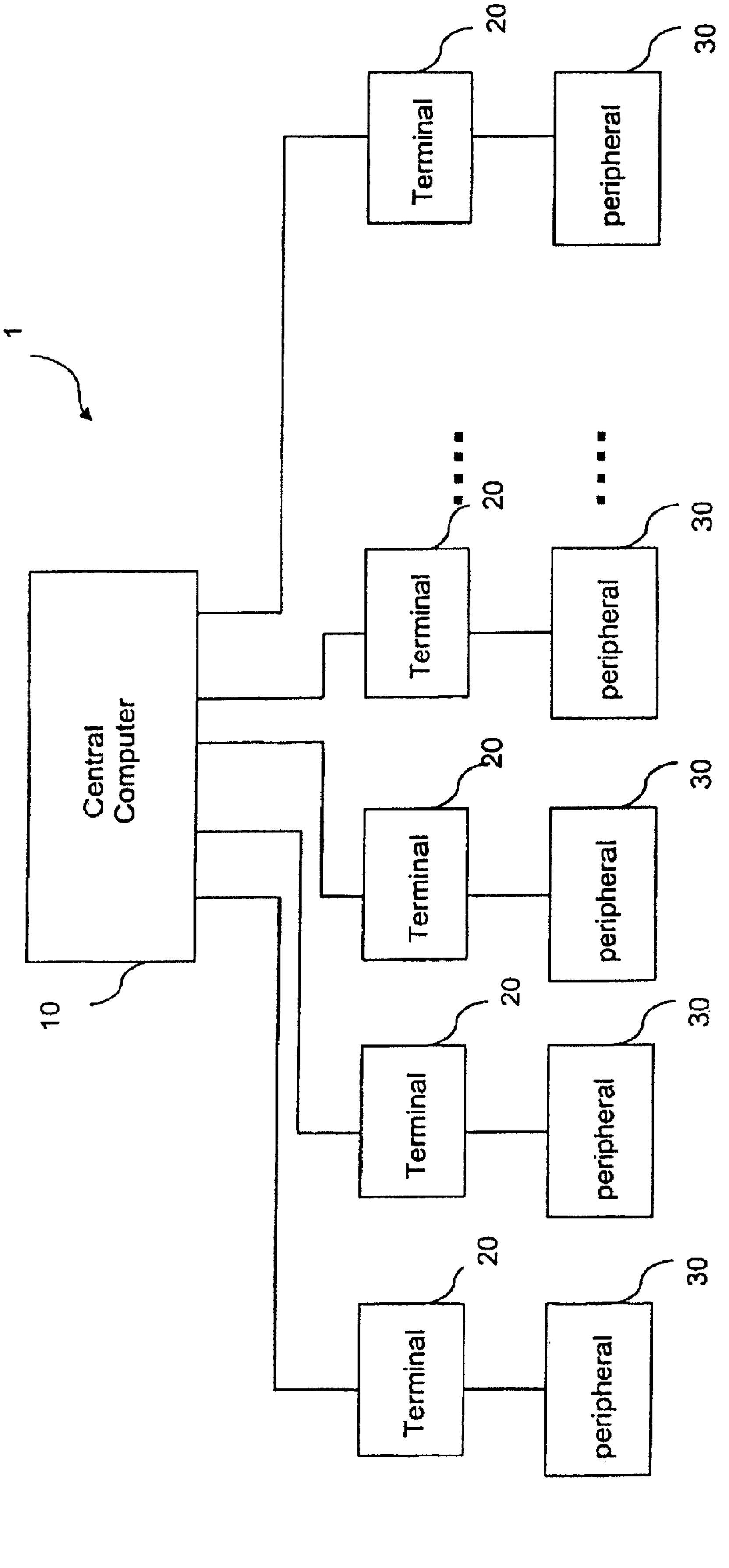
FIG. 1 is a system block diagram of one embodiment of the present invention illustrating a computer network comprised of a central computer such as a mainframe, a mini-computer or other type of computer and a plurality of remote dumb gaming terminals and peripheral devices.

Referring to FIG. 1, a system block diagram of one embodiment of the present invention is shown. A gaming computer network 1 comprised of a central computer 10, such as a mainframe, a mini-computer or other type of computer, a plurality of remote dumb gaming terminals 20 and peripheral devices 30.

The central computer 10 may be a dedicated computer for strictly serving the dumb gaming terminals within a particular casino or a group of casinos. Alternatively, the central computer 10 may operate on a time share basis with other users, gaming or otherwise, as in the case of a mainframe.

The dumb gaming terminals 20 are connected to the central computer 10 by any number of interface technologies including, but not limited to serial and parallel digital ports, modems, wireless communication, etc. The gaming terminals 20 having little, if any, processing capability themselves. In this embodiment, the gaming terminals 20 serve as simple data entry devices. In the preferred embodiment, each gaming table having a lock box (not shown), would have a gaming terminal 20 in close proximity such that the table supervisor could simultaneous manage the table operation and the gaming terminal 20.

Figure 3:
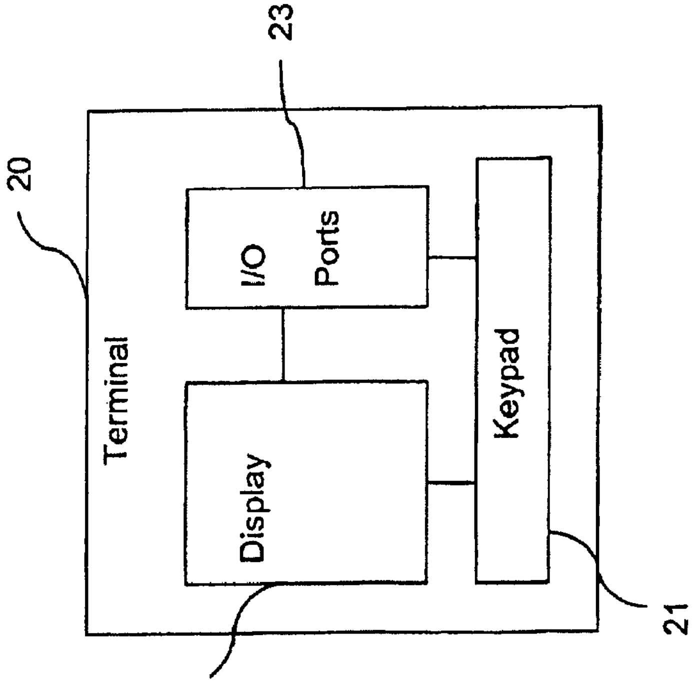
FIG. 3 is a block diagram of the functions required for a dumb terminal for the network embodiment of FIG. 1.

Referring to FIG. 3, an exemplary block diagram of the type of functions incorporated in a dumb gaming terminal 20 are shown. The dumb gaming terminal 20 comprises a keypad or key board 21, a display 22 which may either be a CRT display or a flat panel display such as an LCD display, and one or more I/O ports 23. The dumb gaming terminal 20 transmits data to the central computer 10 via one or more I/O ports 23.

Figure 3A:
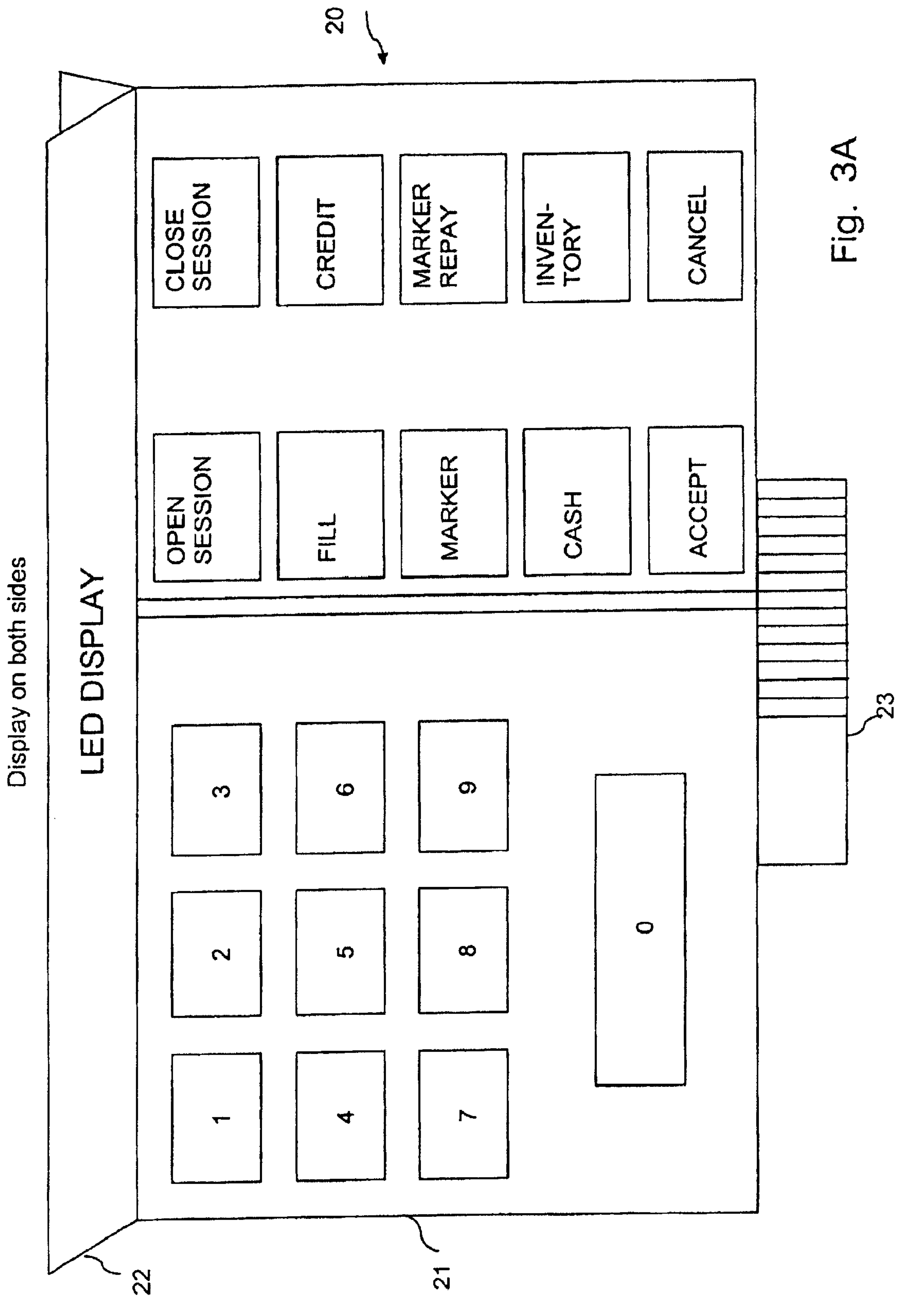
FIG. 3A is a front perspective of one embodiment of a dumb gaming terminal illustrating a typical keyboard, a front and rear (not visible) LED display, and an I/O connector.

Referring to FIG. 3A, one embodiment of the dumb gaming terminal 20 is illustrated. The keypad 21 for the dumb gaming terminal comprises a ten digit pad on the left side and a multiple button function pad on the right hand side. The multiple button function pad is discussed in detail below. The dumb gaming terminal 20 also has a display, which may be an LED display 22, or other type of display such as LCD. The dumb gaming terminal 20 may have an LED display 22 on both the front and rear facing sections. The dumb gaming terminal 20 also has an I/O connector 23 which may plug into a receptacle at the gaming table for connection to the system 1 (FIG. 1).

Referring back to FIG. 1, certain peripheral devices 30 are shown coupled to the dumb gaming terminal 20. These peripheral devices 30 include other types of data entry devices such as magnetic card readers for reading credit cards, employee badges, etc., as well as an optical scanner for reading such items as UPC codes that may accompany gaming chips. Other peripheral devices 30 may include memory devices such as diskette or magnetic tape storage.

Figure 2:
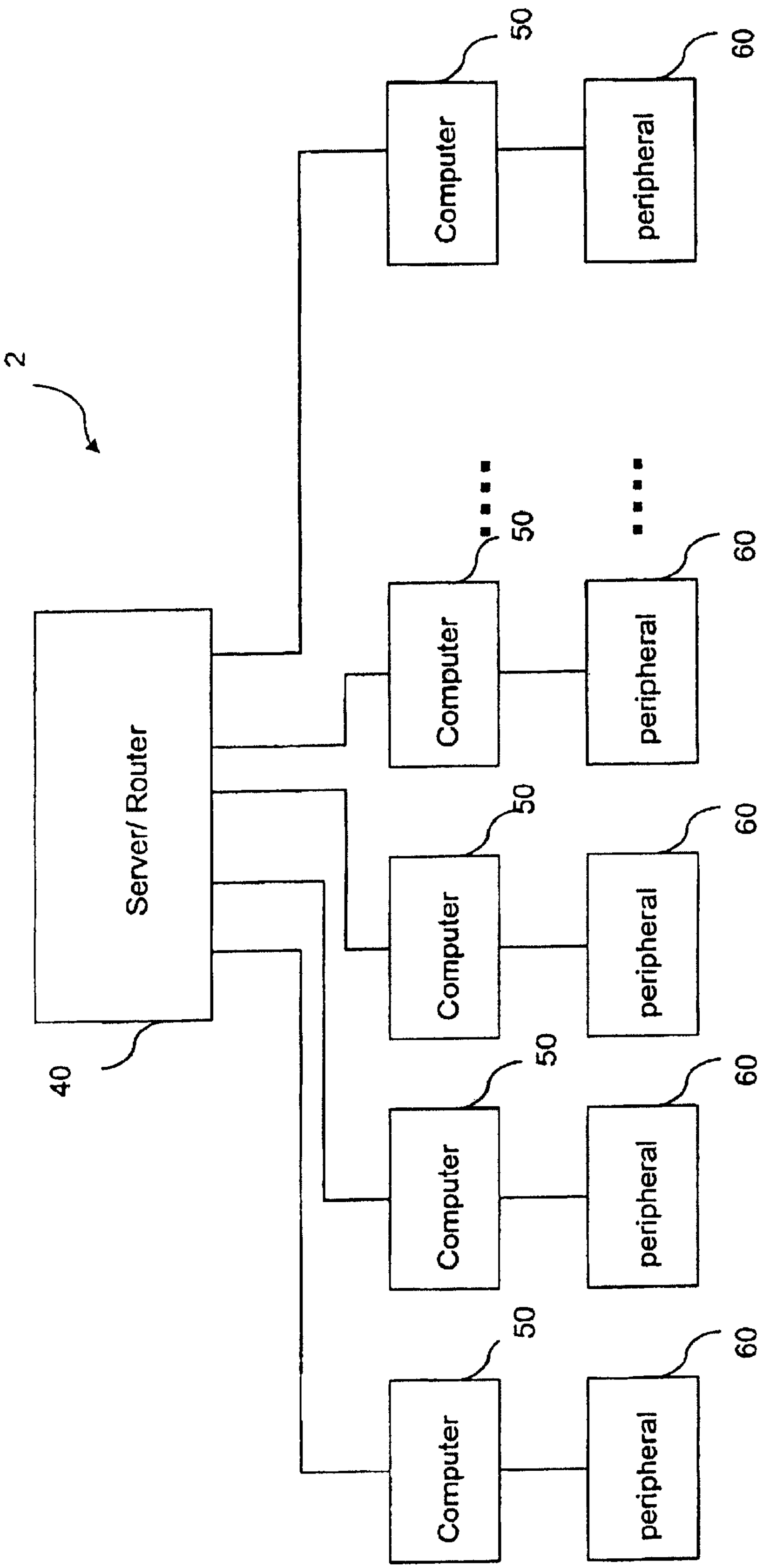
FIG. 2 is a system block diagram of a second embodiment of the present invention illustrating a computer network comprised of a central server and/or router and a plurality of remote gaming computers and peripheral devices.

Referring to FIG. 2, a system block diagram of a second embodiment of the present invention illustrating a computer network 2 comprised of a central server and/or router 40, a plurality of remote gaming computers 50 and peripheral devices 60. The peripheral devices 60 are similar to those described above for the previous embodiment. However, the peripheral devices 60 may have attributes, such as interface requirements, particular to the gaming terminals 50.

The primary task of the central server/router 40 is to interconnect the network of gaming computers 50. In a simple networking embodiment, only a central router 40 is required to permit communication as between gaming computers 50. File storage and program execution takes place locally at each of the gaming computers 50.

However, in a more complex networking embodiment, a central server 40 may be implemented primarily for the purpose of storing common files and software. Each of the networked gaming computers 50 would have access to and could download the data stored on the central server.

The gaming computers 50 are connected to the central server/router 40 by any number of interface technologies including, but not limited to serial and parallel digital ports, i.e. Ethernet, modems, wireless communication, etc. The gaming computers 50 having full processing capability, as would be found for example, in personal computers. Thus, the gaming computer 50 not only serves as a data entry device, but also executes a software program that itemizes, computes and stores all transactions at the relevant gaming table. In the preferred embodiment, each gaming table having a lock box (not shown) would have a gaming computer 50 in close proximity such that the table supervisor could simultaneous manage the table operation and the gaming computer 50.

Figure 4:
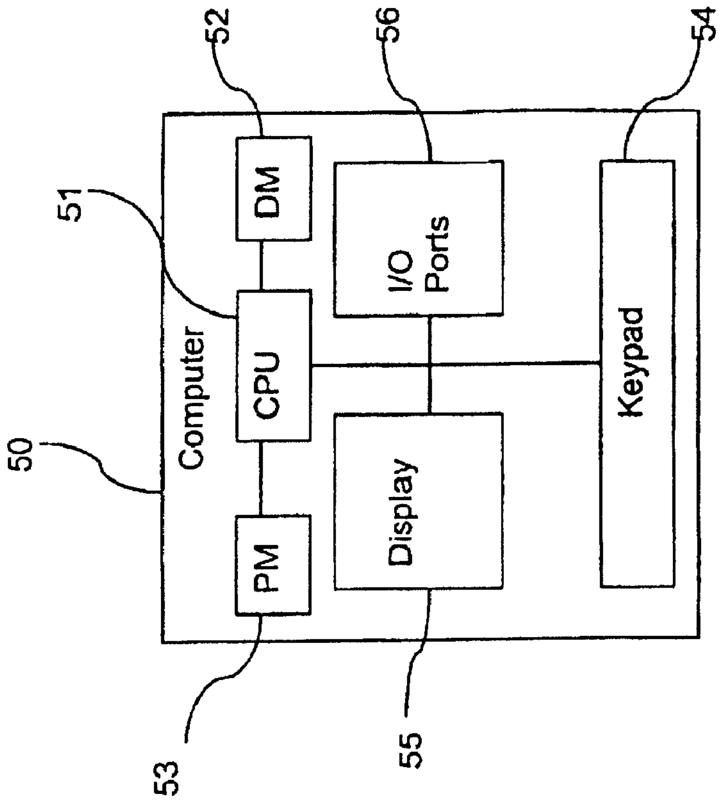
FIG. 4 is a block diagram of the functions required for a gaming computer for the network embodiment of FIG. 2 or in a stand-alone embodiment.

Referring to FIG. 4, an exemplary block diagram of the type of functions incorporated in a gaming computer 50 are shown. The gaming computer 50 comprises a processor or CPU 51 coupled to data (DM) 52 and program (PM) 53 memory, a keypad or key board 54, a display 55 which may either be a CRT display or a flat panel display such as an LCD display, and one or more I/O ports 56. The gaming computer DM 52 and PM 53 memory may be either volatile or non-volatile memory or a combination of both.

It may be noted here that the gaming computers 50 of FIG. 4 may be implemented in a network 2 as shown in FIG. 2 or may be implemented as a stand alone system, i.e. independent non-networked devices. If implemented as a stand alone system, then there is no requirement for a central server/router 40. Thus, for a stand alone system, each gaming computer 50 acts independently to record the transactions at the assigned gaming table.

A typical keyboard or keypad (hereinafter keypad) for either the gaming terminal 20 of FIG. 3 or the gaming computer 50 of FIG. 4 is functionally shown in FIG. 3A. The keyboard may be constructed using various technologies, including but not limited to, membrane, molded plastic, etc.

One portion of the keypad is comprised of ten digit numeric entry keys (0-9). Another portion of the keypad is comprised of multiple function keys arranged in two columns. The Cash key is for cash transactions. The Marker key is for entering transactions related to the issuance of credit. Marker Repay key is for entering transactions relating to the repayment of credit or markers. The Inventory key is for entering transactions related to the inventory of chips. The Accept key is for acknowledging the previously entered transaction. Another key on the keypad is the Open Session key, which is used for either the beginning of a session or the beginning of a dealer's shift. The Close Session key is used for either the close of a session or the close of a dealer's shift. In some embodiments, the Open Session key and Close Session key may comprise a single key which is capable of both functions, including opening and closing sessions. If desired, another key can be used (not shown) for identification of the dealer. The Fill key is used for transactions related to the transfer of chips from the cashier's cage to the table. The Credit key is for entering credits for the transfer of chips to the cashier's cage from the table. The Cancel key is for canceling previously entered numeric data.

Figure 5:
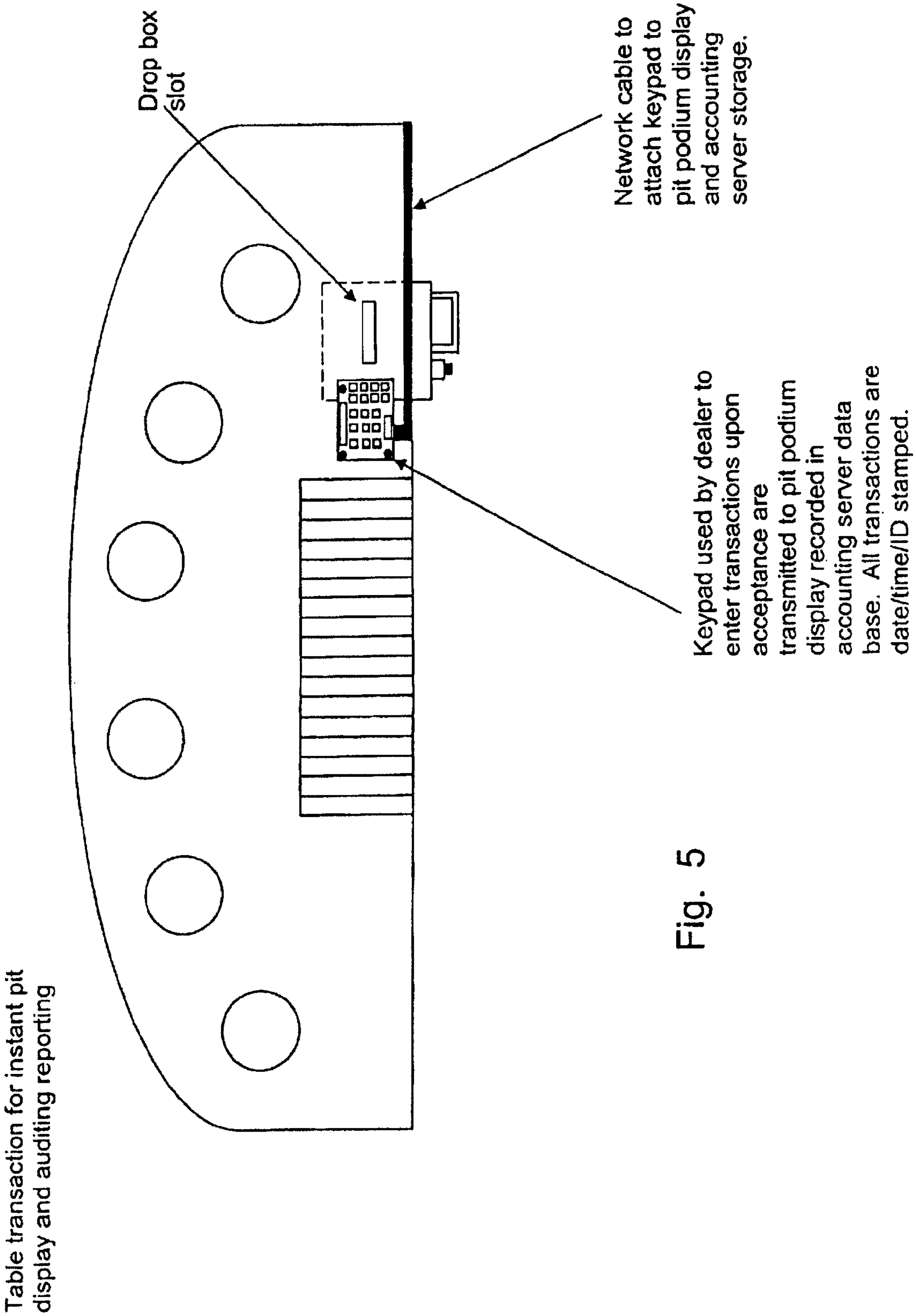
FIG. 5 is a top view of one embodiment of a gaming keyboard that may be employed at the table with either the gaming terminal or the gaming computer.

FIG. 5 depicts one possible location of a keypad of the type shown in FIG. 3A associated with, for example, a "21" or Blackjack table. Preferably, the keypad is located near the slot to the lock box, however, if desired, this location can be varied.

Figure 5A:
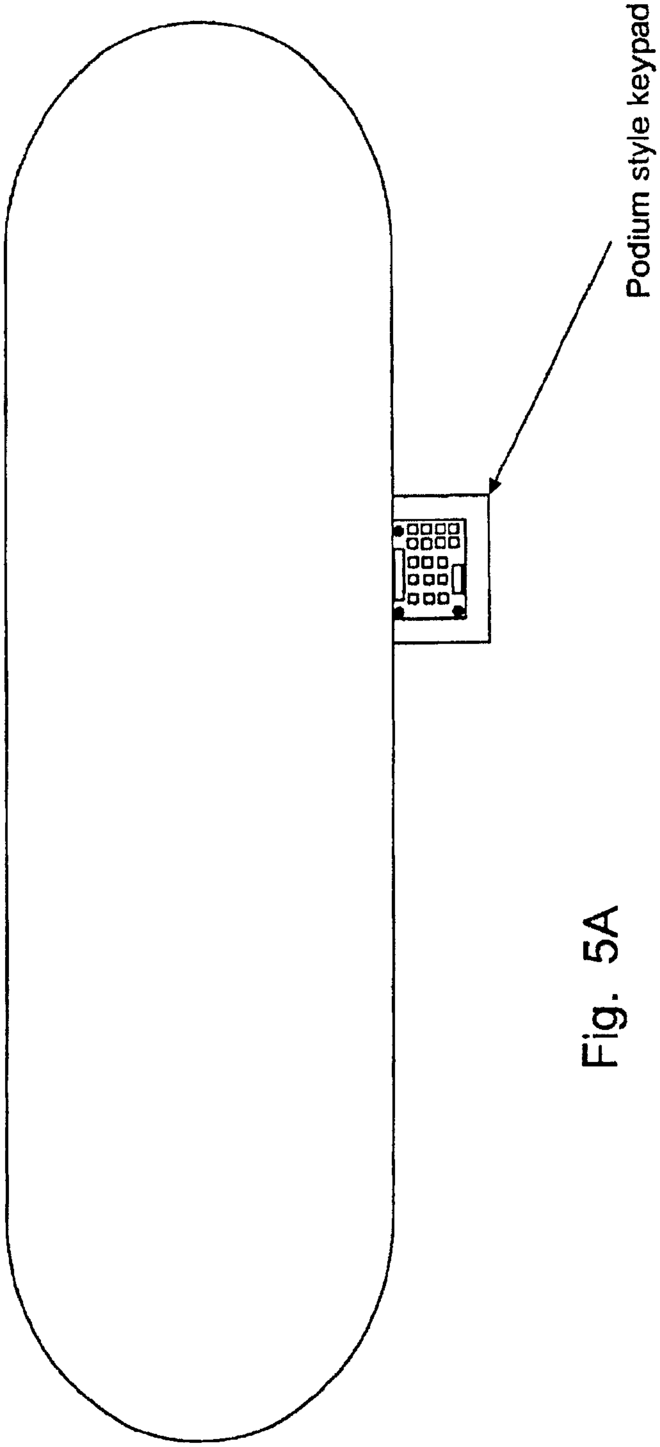
FIG. 5A is a top view of another embodiment of a gaming keyboard that may be employed in proximity to a gaming table.

FIG. 5A depicts another type of gaming table (i.e. a crap table) and one possible location of a keypad near a crap dealer (not shown).

The gaming computer 50 of FIG. 2 executes a software program that records the gaming table transactions. For the embodiment of FIG. 1, the central computer 10 will execute a software program similar to the one described below. A simplified form of such a software program 200 is shown in FIGS. 6, 7 and 8.

Figure 6:
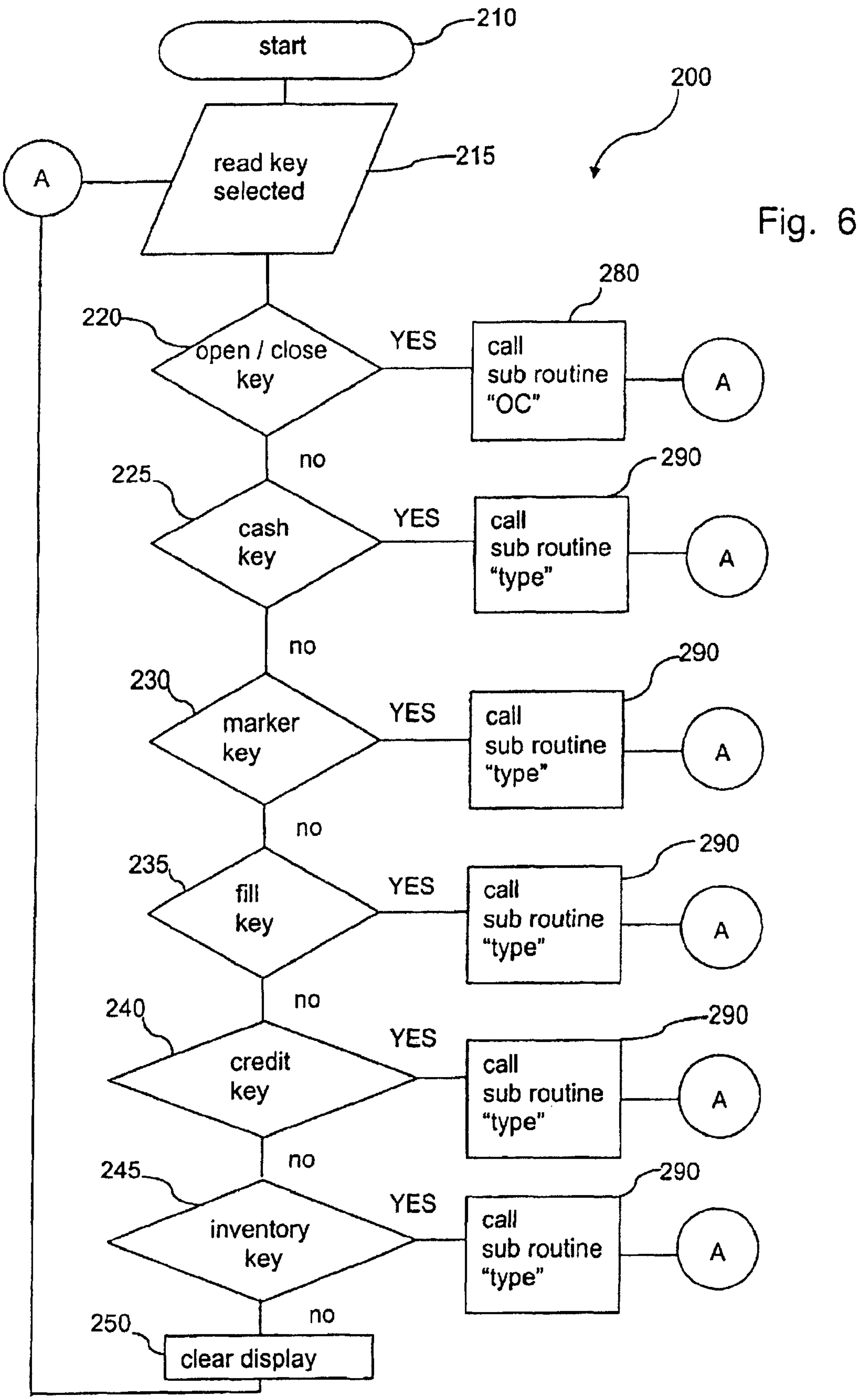
FIG. 6 is a flow chart of an executive portion of a software program that maintains records of gaming table transactions.

Referring to FIG. 6, when the program 200 initializes certain variables are set during the start sequence 210. The program 200 polls the keyboard to determine if a function key has been selected. The selected function key is read 215. If the selected 15 key is the Open/Close key 220, the program calls the subroutine "OC" 280. If any other function key is read 225-245, then the program calls the subroutine "TYPE" 290. If no function key has been selected, the display is cleared 250 and the program loops to poll the keyboard.

Figure 7:
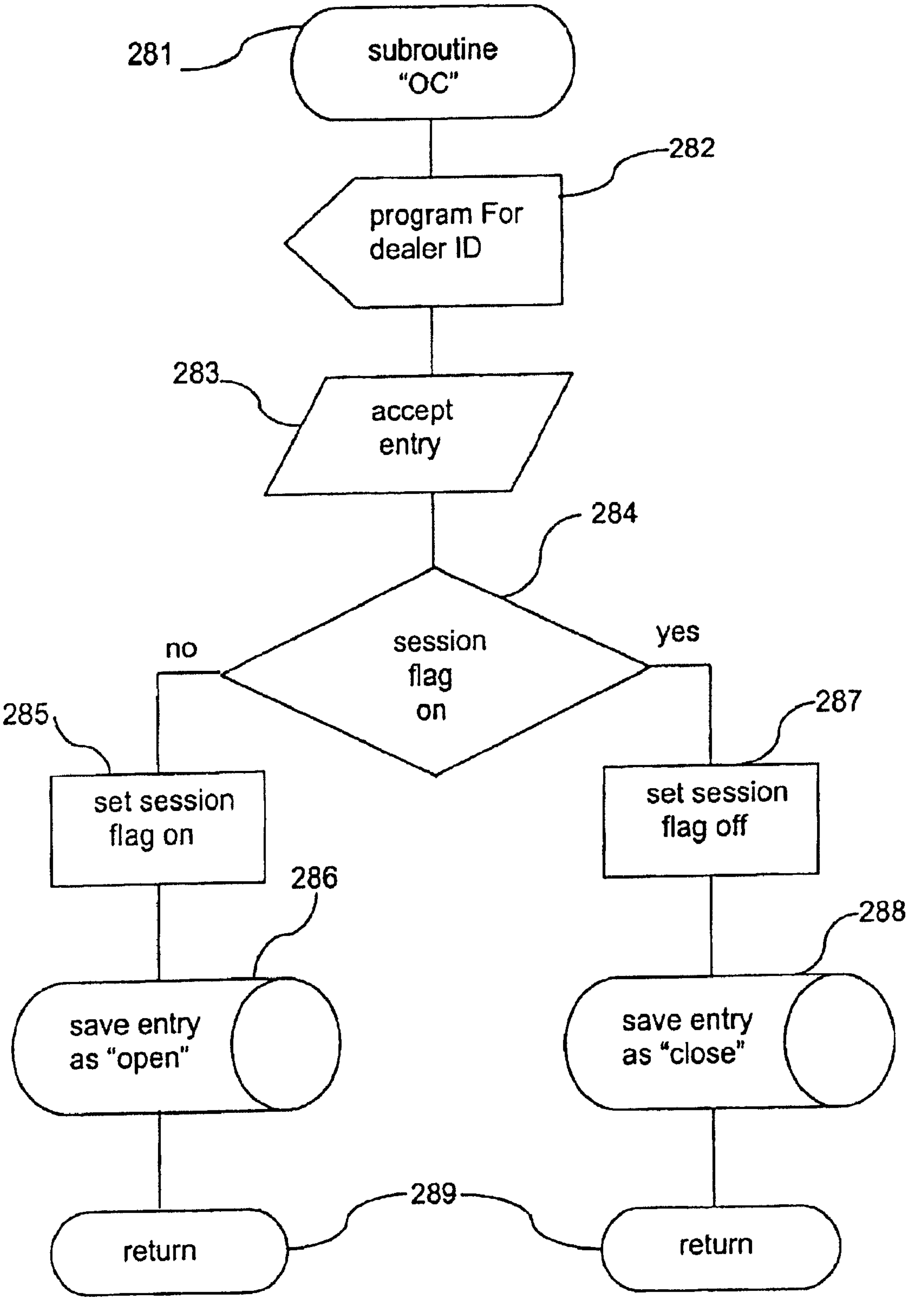
FIG. 7 is a flow chart of a subroutine portion of a software program that maintains records of gaming table transactions.

Referring to FIG. 7, the subroutine "OC" 281 processes an opening or closing of the session. The dealer is prompted for an ID number 282. After entering the ID number, which appears on the display, the dealer must accept or cancel the entry 283. If the session flag is not on 284, which means the opening of a new session, the flag is toggled to on 285, and the entry is saved as "open" 286. From this branch, the subroutine returns to the main program 289. If the session flag is set to on, which means the session is now to be closed, the flag is toggled off 287, and the entry is saved as "closed" 288. From this branch, the subroutine returns to the main program 289.

Figure 8:
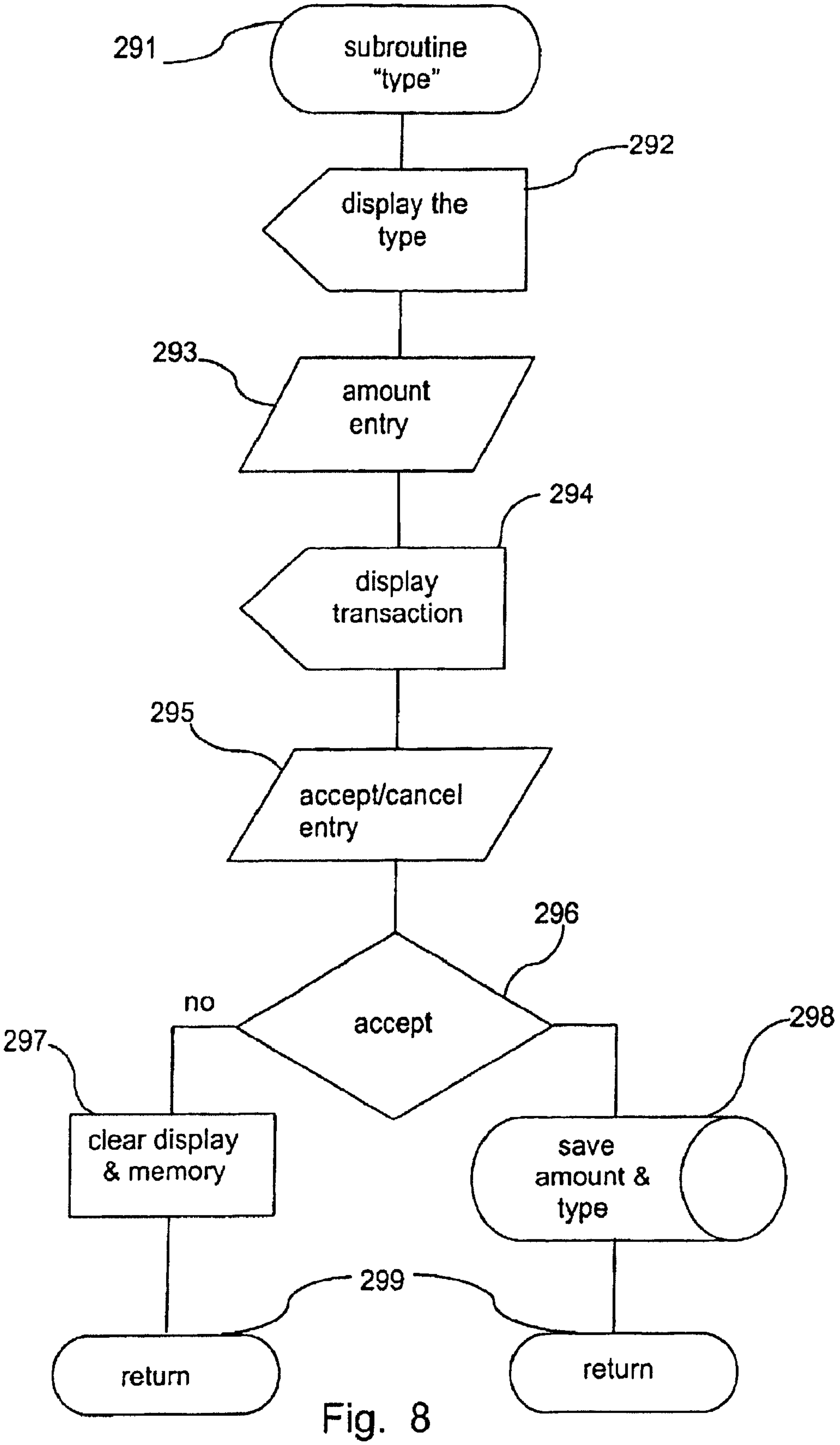
FIG. 8 is a flow chart of another subroutine portion of a software program that maintains records of gaming table transactions.

Referring to FIG. 8, the subroutine "TYPE" 291 processes the particular table transaction as selected. The dealer enters the amount of the transaction 292 which is displayed by the TYPE. After entry of the amount on the numeric portion of the keypad, the dealer must accept or cancel the transaction displayed 293 (e.g. cash, credit, etc.). If the dealer cancels the transaction, the TYPE and amount are cleared from the display and from memory 197. From this branch, the subroutine returns to the main program 299. If the dealer accepts the transaction, the TYPE and amount of the transaction are stored 298. From this branch, the subroutine returns to the main program 299.

Furthermore, simple I/O subroutines would permit periodic or on demand reporting to a central server 40 or casino management gaming computer 50 in the embodiment of FIG. 2. Furthermore, simple I/O subroutines would permit periodic or on demand 10 reporting to a central server 40 or casino management gaming computer 50 in the embodiment of FIG. 2.

Figure 9:
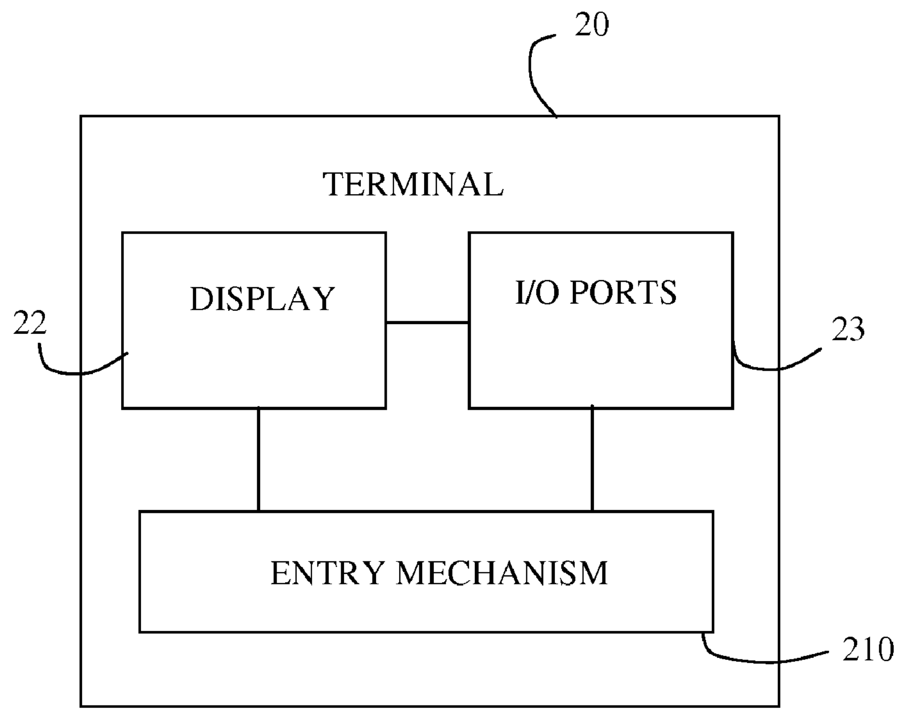
FIG. 9 is a schematic block diagram of a gaming terminal.

Referring to FIG. 9, another example dumb gaming terminal 20 is illustrated in block diagram form. The dumb gaming terminal 20 comprises the display 22 and the I/O ports 23, as previously described.

Figure 10:
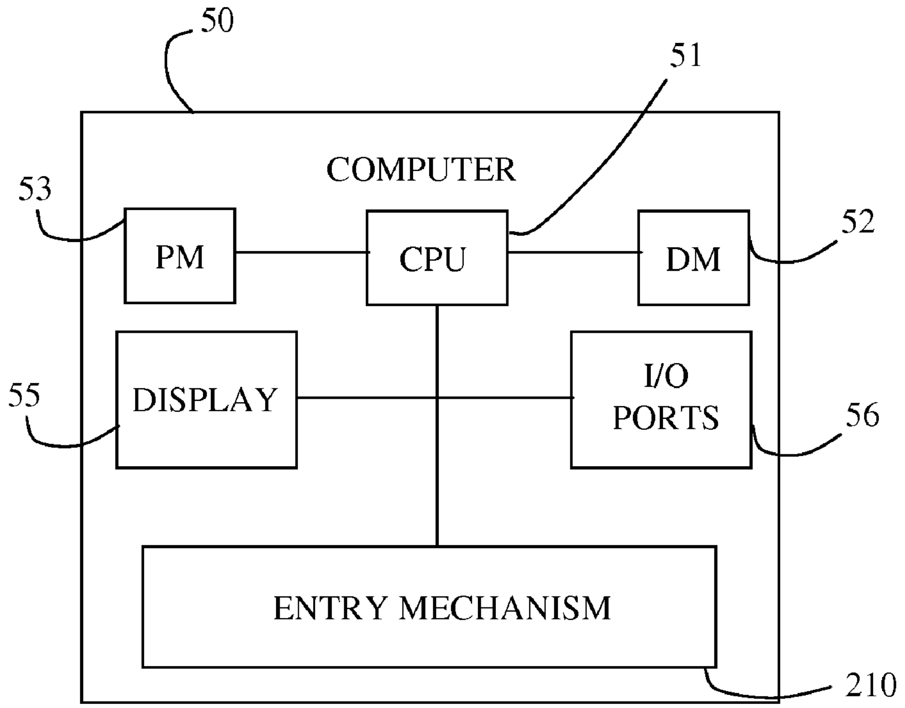
FIG. 10 is a schematic block diagram of a game computer.

Referring to FIG. 10, another example game computer 50 is illustrated in block diagram form. The computer 50 comprises the CPU, 51, data memory 52, program memory 53, display 55 and the I/O ports 56, as previously described.

In each of the terminal 20 and the computer 50, the display 22, 55 may be variously implemented. Such implementations include, as examples, a CRT, an LCD, other flat display technology, or other display device. In any case, the display 22, 55 provides selected information to the dealer.

The display 22, 55 may also be implemented to provide selected information to selected other entities, which entities generally would be proximate to, and have some involvement with, the gaming table to which is associated the terminal 20 or the computer 50. The selected entities generally may include other casino personnel (e.g., the pit boss). The selected entities may also include the player(s).

Information may be provided to an entity other than the dealer in various ways.

As an example, the display 22, 55 may be implemented to include a single display device for the dealer or another entity. In some embodiments, the display 22, 55 includes one or more display devices, where one display device may be disposed for the dealer's use, and/or one or more display devices are disposed for use by one or more other entities. In some embodiments, the display 22, 55 may be implemented so that the dealer is provided an LCD display (e.g., viewable only by the dealer). In some embodiments one or more additional LCD displays are provided to others, such as for example, other casino personnel or independent agents. However, it should be understood that the information made available to each particular entity via the display 22, 55, the terminal 20 or computer 50, may differ from information made available to other entities. For example, information made available to the dealer may differ from the information made available to an independent agent or other casino personnel. In some embodiments, information made available to dealers or others includes transactional information, such as the information described in this application, which can provide an accounting of gaming transactions in real-time, among other things.

It should be understood that information provided through display 22, 55 may by presented in various ways (e.g., graphs, tables, or otherwise). Also, the information and its presentation may be selectable or preset. As an example, a casino may determine the types of information made available on the respective displays.

The terminal 20 and computer 50 also include an entry mechanism 210. The entry mechanism 210 may include the respective keypad 21, 54, as previously described. With or without the keypad 21, 54, the entry mechanism 210 includes one or more scanning devices. The scanning devices may be based on, as examples, one or more of optical scan technologies (e.g., such as scanners of currency or documents), radio frequency technologies (e.g., RFID chip technology), electromagnetic reader technologies (e.g., the technology used to read credit cards, plastic card keys at hotels, and the like), bar code reader technologies and/or voice recognition technologies.

The entry mechanism 210 generally is implemented to enable the processing of transactions. When the entry mechanism 210 includes only the keypad 21, 54, processing of transactions is enabled as previously described. When the entry mechanism includes both the keypad 21, 54 and one or more scanning devices, the processing of transactions may be enabled so as to proceed either by use solely of the scanning device(s), by use of both the scanning device(s) and the keypad, or by use of the keypad alone. The exact processing used by a particular dealer may depend on the type of transaction and/or depend on the implemented scanners (e.g., the keypad may be the sole, superior, casino-preferred, or even dealer-preferred means to enter a particular transaction). To illustrate, an implemented scanner may be enabled to recognize the type of transaction. In that case, the dealer need not use the keypad to so enter the transaction type. However, even in that case, the terminal or computer may be implemented so that the dealer confirms that the transaction type has been properly recognized by the scanner (e.g., by pushing a selected button, by voicing confirmation if voice recognition is enabled, or by taking no action where a time out indicates confirmation).

It is noted that optical and electromagnetic scanners are in use in slot machines. Slot machines are enabled to receive a player's card via a card receptacle, and to scan the card to read, typically among other things, the money balance from the card's electromagnetic strip, which reading activates the slot machine for play. The slot machine also adds/subtracts from the balance stored on that card's strip. Slot machines also are enabled to receive paper currency via an optical reader receptacle such that, upon scanning/recognizing proper currency, the currency's amount is added to the balance displayed by the machine and machine is activated for play.

Similarly, scanners are contemplated to be implemented on gaming tables. Generally, the implementation at gaming tables is via the entry mechanism 210. Doing so would yet permit the recording of all transactions that enter into the computation of win or loss at the gaming tables at the time the transaction took place and the simultaneous recording in the casino's central accounting department, as previously described. As well, doing so enables the accounting department or management of the casino to know by the transactions, so recorded, the contents of each lock box in the entire casino (i.e., reducing or eliminating reliance on the count of the boxes at the end of the three daily count shifts).

In an example implementation at a gaming table, the entry mechanism 210 includes two receptacles, both employing optical scanning technology. One such receptacle would receive and process currency. The other receptacle would receive and process documents. After scanning the currency/documents, the receptacles would feed the currency/documents into the lock box.

Typically, the currency receptacle would be sized responsive to the currency. Similarly, the document receptacle may be sized responsive to the documents it will receive. To further enable the sizing of the document receptacle, the document's size may be standardized by the casino or across casinos (e.g., by private arrangement among casinos, or otherwise). These documents may include, among others: (i) documents indicative of the beginning, chip rack inventory, (ii) fill slips, (iii) credit slips (iv) IOUs, (v) markers, (vi) IOU repayment slips, (vii) marker repayment slips, and/or (viii) documents indicative of the ending chip rack inventory. Generally, casinos use IOUs and markers that in size and shape, are the same as or substantially similar to, bank checks.

In order to facilitate use of the document receptacle, the indication of amounts on the documents may be standardized. As an example, in addition to standard size, the documents may be otherwise standardized, including providing one or more fields wherein amounts are placed (e.g., one box for each integer in the amount). While amounts may be handwritten, and regardless of whether the above-described fields are employed, the amounts may be entered on a document using a standard approach. The standard approach may be variously implemented, including, as examples, using a particular imprint device (e.g., a stamp, printer, labeler, or other technology), using a particular ink, using a particular location, or otherwise. Standardization, as described, generally facilitates scanning performance, including accuracy, via the uniformity and consistency introduced by the standards, particularly when the standards respond to the reading ability of the scanner. Moreover, standardization may support security considerations.

In another example implementation, the entry mechanism 210 may include a hand-held or table-top mounted scanner. Such scanner may be particularly useful for scanning RFID-chips that are disposed inside carriers where, after scan, neither the chips nor the carrier are typically fed into the lock box. However, where the scanned item is typically fed into the lock box, the dealer does so as is the present custom.

Whatever the implementation of the terminal/computer, it is contemplated to associate each transaction with various data, including, as examples, time, date, table number and dealer identification.

Although the descriptions above are directed to various figures and include various examples, it is understood that changes in form and detail may be made in the descriptions, figures and/or examples without departing from, or limiting, the spirit and scope of the claimed subject matter.

What is claimed is:

1. A computer-implemented method of recording gaming table transaction data, comprising:

a) receiving a signal initiating a session from a data entry device, wherein initiating a session includes:

i) receiving an input from an open/close function key selected on the data entry device at a time when a session flag is in an off state;

ii) receiving an operator identification from the data entry device;

iii) determining via a processor whether to enter the operator identification and changing the state of the session flag to an on state in response thereto;

b) receiving a first input from the data entry device, the first input indicative of a transaction type;

c) displaying the transaction type on at least two display devices in at least two locations;

d) receiving, subsequent to (c), data indicative of a dollar amount associated with the displayed transaction type from the data entry device;

e) displaying the dollar amount on at least two display devices in at least two locations; and a processor for determining whether to record an entry including at least the dollar amount, wherein the transaction type is selected from the group consisting of inventory, cash, marker, credit, fill, and marker repay.

2. The computer-implemented method of claim 1, wherein determining whether to enter the operator identification comprises the processor determining whether a next input after receiving the operator identification is from an accept key or from a cancel key.

3. The computer-implemented method of claim 2, further comprising:

waiting, subsequent to (d), to receive a second input from one of two allowable inputs.

4. The computer-implemented method of claim 3, further comprising:

receiving the second input from an accept key selected on the data entry device; and recording the transaction type and the dollar amount in memory.

5. The computer-implemented method of claim 4, further comprising:

outputting the transaction types and dollar amounts recorded in memory.

6. The computer-implemented method of claim 3, further comprising:

receiving the second input from a cancel key selected on the data entry device; and clearing the displayed transaction in response thereto.

7. The computer-implemented method of claim 1, further comprising terminating the session through a signal generated by the data entry device.

8. The computer-implemented method of claim 7, wherein terminating the session comprises receiving an input from the open/close function key at a time when a session flag is in the on state from the data entry device;

receiving an operator identification from the data entry device; and the processor changing the state of the session flag to the off state in response thereto.

9. A computer-implemented method of tabulating entered transaction data for comparison to the inventory of gaming chips, receipts, and cash that are deposited in a gaming table lock box, performing through one or more processors, memory devices, display devices and data input/output devices the steps comprising:

a) receiving an input from a function key;

b) prompting an operator, if the input was received from an open/close function key, for an operator identification;

c) displaying, if the input was received from a cash function key, a cash transaction type, receiving first information indicative of a first dollar amount that is associated with the cash transaction, and storing the cash transaction type and the first dollar amount;

d) displaying, if the input was received from a marker function key, a marker transaction type, receiving second information indicative of a second dollar amount that is associated with the marker transaction, and storing the marker transaction type and the second dollar amount;

e) displaying, if the input was received from a fill function key, a fill transaction type, receiving third information indicative of a third dollar amount that is associated with the fill transaction, and storing the fill transaction type and the third dollar amount;

f) displaying, if the input was received from a credit function key, a credit transaction type, receiving fourth information indicative of a fourth dollar amount that is associated with the credit transaction, and storing the credit transaction type and the fourth dollar amount;

g) displaying, if the input was received from an inventory function key, an inventory transaction type, receiving fifth information indicative of a fifth dollar amount that is associated with the inventory transaction, and storing the inventory transaction type and the fifth dollar amount; and h) displaying, if the input was received from a marker repay key, a marker repay transaction type, receiving sixth information indicative of a sixth dollar amount that is associate with the marker repay transaction, and storing the marker repay transaction type and the sixth dollar amount.

10. The computer-implemented method of claim 9, further comprising repeating (a)-(h).

11. The computer-implemented method of claim 10, further comprising:

receiving, prior to storing any transaction type and prior to storing any dollar amount, an input from an accept function key.

12. The computer-implemented method of claim 9, further comprising:

subsequent to receiving an operator identification, determining whether a session flag is set;

setting the session flag, if the session flag is not set; and resetting the session flag, if the session flag is set.

13. The computer-implemented method of claim 12, further comprising:

determining whether an input has been received from the accept function key prior to determining whether the session flag is set.

14. The computer-implemented method of claim 9, further comprising:

receiving an operator identification;

receiving an input from an accept function key; and toggling the state of a session flag.

* * * * *